July 21, 1931.  G. A. BURR ET AL  1,815,046

OUTLET BUSHING STRUCTURE

Filed Jan. 23, 1929

INVENTORS
Gordon A Burr and
James H. Frakes.
BY
Wesley G. Carr
ATTORNEY

Patented July 21, 1931

1,815,046

UNITED STATES PATENT OFFICE

GORDON A. BURR, OF WILKINSBURG, AND JAMES H. FRAKES, OF PITTSBURGH, PENNSYLVANIA, ASSIGNORS TO WESTINGHOUSE ELECTRIC AND MANUFACTURING COMPANY, A CORPORATION OF PENNSYLVANIA

OUTLET-BUSHING STRUCTURE

Application filed January 23, 1929. Serial No. 334,450.

Our invention relates to bushing structures and particularly to electrical-outlet-bushing structures of the heavy-duty outdoor type.

One object of our invention is to provide a triple-seal structure for an outdoor bushing to render the same air and water tight.

Another object of our invention is to so enclose a mechanically-sealed structure by a molded fluid sealing medium as to reinforce the mechanical structure.

Another object of our invention is to prevent the formation of fluid-retaining pockets ordinarily occurring in seals of the stuffing-box type.

Another object of our invention is to provide a novel gasket structure for bushing seals.

A further object of our invention is to provide a bushing sealing structure that shall be simple and durable in construction, economical to manufacture and effective in its operation.

In bushings of the heavy-current outdoor type, it has heretofore been exceedingly difficult, and a source of great trouble, expense and annoyance to obtain air-tight and water-tight joints at the places where the conducting means extend through the outer ends of the bushings.

A seal structure of the ordinary screwed or clamped stuffing-box type has the objection that it almost invariably opens a pocket for the retention of moisture at the seal.

It is our aim to overcome the difficulties and disadvantages of seals heretofore employed and to provide a simple and economical means that shall be satisfactory for this service.

Accordingly, in practicing our invention, we employ a seal consisting of a simple standard and well known parts that are so arranged as to render the seal substantially, absolutely and permanently air and moisture tight.

In attaining this end, the disadvantageous feature of the ordinary stuffing-box seal, wherein moisture-retaining pockets are formed, is actually taken advantage of by filling the pocket spaces with a moisture-proof compound or medium which, in itself, forms an additional seal against the moisture. A tertiary seal is provided for reinforcing and protecting the sealing medium.

Figure 1:
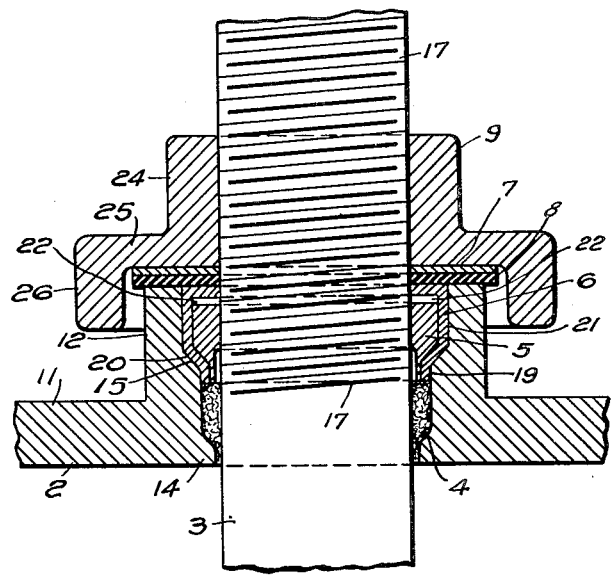
Figure 2:
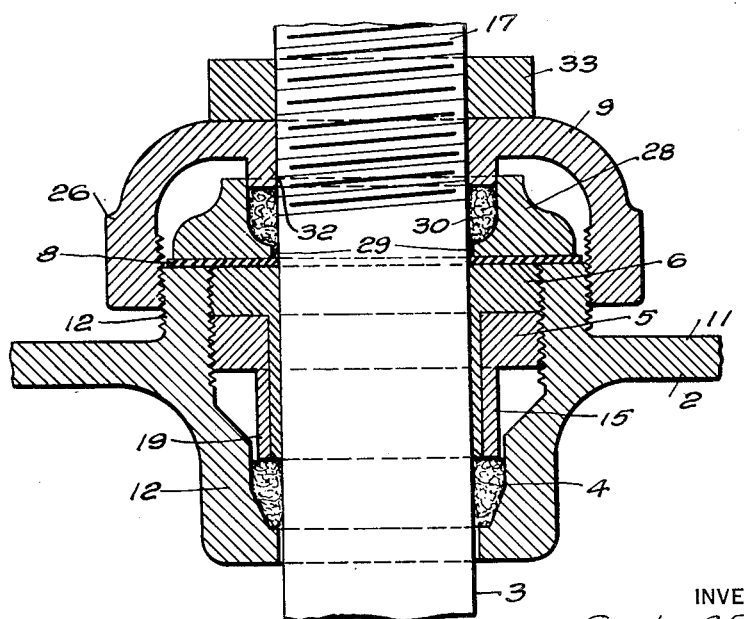

Figure 1, of the accompanying drawings, is a side view, partially in section and partially in elevation, of an outlet-bushing-seal structure constructed in accordance with our invention; and Fig. 2 is a similar view of a modified form of our invention.

Referring to Fig. 1, the device comprises, in general, a member 2 having an opening through which a conductor or member 3 extends, a body of packing material 4, such as asbestos or similar material, a nut 5, a sealing medium or compound 6, sealing members or gaskets 7 and 8 and an upper clamping member or nut 9.

The member 2, preferably of metal, constitutes an end-closure member or cap for the end of an insulating tubular structure (not shown) surrounding the conductor 3 and comprises an end-closure portion 11 and a tubular portion 12.

The portions 11 and 12 are provided with inner portions or bores of different diameters providing inner shoulder portions 14 and 15. These shoulders and an inner wall surface adjacent thereto provide a pocket for the packing body 4 and the sealing medium 6 which surrounds the sides and top of the nut 5.

The conductor 3 is preferably of cylindrical shape having threaded portions 17 and may be of hollow tubular form or of solid bar construction.

The nut 5, is of ring like character having a substantially tubular extension 19 at one end thereof, the inner surfaces of which are slightly spaced from the conductor 3 and the outer surfaces of which are spaced from the adjacent surface of the portion 12. The nut further comprises a sloping surface 20 for spaced relation with respect to the shoulder 15, a cylindrical outer surface 21 in spaced conforming relation to the adjacent surface of the portion 12, and outer end openings or slots 22 for coperation with a wrench to turn the nut.

The sealing medium 6 is preferably of the poured or molded type, such as a compound having an asphalt base and the characteristics of closely adhering to the adjacent metal parts and permanently filling the space which it occupies to prevent the admission of air and moisture.

The gaskets 7 and 8 are preferably constructed of a relatively hard, smooth material, such as vellumoid paper, whereby they may slide on each other. The gasket 8 is held in position against the outer end of the tubular portion 12 which adheres to the molded sealing medium 6. The gasket 7 is disposed between the adjacent surfaces of the gasket 8 and the nut 9.

The nut 9 comprises a threaded collar portion 24, a portion 25 for compressing the gaskets 7 and 8 and an overhanging or weather-protective flange portion 26.

In assembling the structure, the member 2 is placed over the conductor 3 in substantially the position shown, after which the annular packing body 4 and the nut 5 are passed over the conductor to the position shown. By screwing the nut 5 downwardly or longitudinally along the member 3, the packing body 4 is forced against the sloping shoulder 14 and forced inwardly by the shoulder against the conductor 3, the parts being so related that, in the most tightly compressed condition of the body 4, the nut 5 assumes the position shown in the drawings.

After the above operations, the medium 6 is poured, while in a liquid state, into the spaces surrounding and over the nut 5, after which the medium hardens. While the medium 6 is still liquid, the gasket 8 is placed in position and held therein by adherence to the medium 6, after which the gasket 7 and the nut 9 are placed in position and the nut screwed down to compress the gaskets 7 and 8. A filling medium, such as red lead, white lead, iron oxide cement or other suitable material is placed in the screw threads between the conductor 3 and the nut 9.

During the manipulation of the nut 9, the gasket 7 slips relative to the gasket 8 and may sometimes slip relative to the nut 9, the operation ensuring the retention of the gasket 8 in its sealed relation to the body 6.

By the invention, a substantially triple seal is provided, the first seal consisting of the body 4 and the nut 5, the second seal consisting of the body 6 in its relation to the nut 5, the portion 12 and the gasket 8, and the third seal consisting of the gaskets 7 and 8 and the nut 9.

In the form of our invention shown in Fig. 2, in which corresponding parts are designated by corresponding reference characters, the nut 5 is screw-threadedly associated with the portion 12 as is also the overhanging portion 26 of the nut 9.

A ring 28, disposed over the gasket 8, is provided with an inner shoulder 29 and an inner space for the reception of a body or ring 30 of packing material similar to the body 4 of Fig. 1.

As a substitute for the portion 25 of Fig. 1, the nut 9 is provided with a tubular portion or collar 32, similar to the portion 19 of the nut 5, for compressing the body 30.

The nut 9, in addition to its screw-threaded relation to the portion 12, may also be screw-threadedly associated with the conductor 3, and the threads sealed, as above mentioned. A lock nut 33 is provided to hold the nut 9 in position.

The structure of Fig. 2 is preferably for use in connection with larger bushings than those employed in connection with the structure of Fig. 1.

While we have shown and described particular forms of our invention, changes may be effected therein without departing from the spirit set forth in the appended claims.

We claim as our invention:

1. In combination, a member having a through opening of different diameters providing three successively larger annular portions and annular shoulders sloping from the largest to the intermediate portion and from the intermediate to the smallest portion, a member extending through said opening, a body of packing material around said through member between said shoulders, a nut on one of said members having a tubular portion at one end for compressing said body, a sealing medium enclosing the outer end of the nut and extending along one side of the nut to said packing material, a sealing member surrounding said through member over said sealing medium, and a second nut on one of said members for compressing said sealing member.

2. In combination, a member having a through opening of different diameters providing an annular shoulder, a member extending through said opening, a nut on one of said members in said opening, a body of packing material around said through member between said shoulder and one end of the nut, a sealing medium enclosing the outer end of the nut and extending along one side of the nut to said packing material, a second nut on one of said members, and a sealing member surrounding said through member between said apertured member and said second nut.

3. In combination, a member having a through opening, a member extending through said opening, one of said members providing an annular shoulder, a longitudinally movable member surrounding said through member in said opening, a body of packing material around said through member between said shoulder and one end of said movable member for compression against the shoulder by the movable member, a sealing medium enclosing the movable member at its other end, and extending along one side thereof to said packing material, a second longitudinally movable member surrounding said through member, and a sealing member surrounding said through member between said apertured member and said second movable member.

4. In combination, a member having a through opening, a member extending through said opening, means in the opening including a body of packing material and a member for compressing the material to seal the opening, a medium in the opening over the outer end of said compressing member and extending along one side of the compressing member to said packing material for sealing the compressing member, and tertiary means for sealing said medium.

5. In combination, a member having a through opening providing an inwardly-extending perimetral shoulder, a member extending through said opening, a nut on one of said members entirely in said opening having an end portion longitudinally opposite said shoulder for co-operation with a packing element between said shoulder and said nut, a molded sealing body adhering to the nut and to said members and extending along one side of the nut to said packing element, said sealing means enclosing said nut in said opening.

6. In combination, a member having a through opening, a member extending through said opening, one of said members providing an annular shoulder between it and the other member, an annular sealing element on said shoulder, a nut longitudinally movable on one of said members in laterally spaced relation to the other member and disposed entirely in said opening to compress said sealing element at one end of the nut, and a molded sealing medium sealed between said members over the other end of the nut and filling said lateral space to said sealing element.

7. In combination, a member having a through opening, a member extending through said opening, one of said members providing an annular shoulder between it and the other member, an annular sealing element on said shoulder, and a nut disposed entirely in said opening in longitudinally movable position on one of said members and in laterally-spaced relation to the other member, said nut having a tubular longitudinal extension laterally spaced from said extending member at one end of the nut to compress said sealing element at a position outwardly spaced from the inner perimeter thereof, and a molded sealing medium sealed between said members over the other end of the nut and filling the lateral space between said members to said sealing element.

In testimony whereof, we have hereunto subscribed our names this 18th day of January, 1929.

GORDON A. BURR.
JAMES H. FRAKES.